United States Patent
Yamashita et al.

(10) Patent No.: US 8,220,904 B2
(45) Date of Patent: Jul. 17, 2012

(54) LIQUID COMPOSITION, SET, LIQUID CARTRIDGE, INKJET RECORDING METHOD, AND INKJET RECORDING APPARATUS

(75) Inventors: Tomohiro Yamashita, Yokohama (JP); Shin-ichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 12/874,954

(22) Filed: Sep. 2, 2010

(65) Prior Publication Data
US 2011/0057993 A1    Mar. 10, 2011

(30) Foreign Application Priority Data
Sep. 10, 2009    (JP) .................... 2009-209538

(51) Int. Cl.
*B41J 2/05*    (2006.01)

(52) U.S. Cl. ............... 347/56; 347/20; 347/100

(58) Field of Classification Search .......... 347/20, 347/56, 95, 100; 106/31.6, 31.13, 31.27; 523/160–161
See application file for complete search history.

(56) References Cited

U.S. PATENT DOCUMENTS

| | | | |
|---|---|---|---|
| 6,646,024 B2 * | 11/2003 | Beach et al. ............ 523/160 |
| 2002/0069789 A1 | 6/2002 | Katsuragi | |
| 2006/0203055 A1 | 9/2006 | Doi | |
| 2008/0055385 A1 | 3/2008 | Houjou | |

FOREIGN PATENT DOCUMENTS

JP    2002-172847 A    6/2002

\* cited by examiner

*Primary Examiner* — Juanita D Jackson
(74) *Attorney, Agent, or Firm* — Canon USA Inc IP Division

(57) ABSTRACT

A liquid composition used in combination with an ink containing a coloring material is ejected by the action of thermal energy from a recording head including a heating resistor having a protecting layer that contains at least one of a metal and a metal oxide and that is to come into contact with the liquid composition. The liquid composition contains an organic acid having a carboxy group, an alkali metal ion, an organic acid having a sulfonate group, a polyvalent metal ion, and water.

10 Claims, No Drawings

LIQUID COMPOSITION, SET, LIQUID CARTRIDGE, INKJET RECORDING METHOD, AND INKJET RECORDING APPARATUS

BACKGROUND OF THE INVENTION

1. Field of the Invention

The present invention relates to a liquid composition, a set, a liquid cartridge, an inkjet recording method and an inkjet recording apparatus.

2. Description of the Related Art

A liquid-liquid reaction system using an organic acid has been studied for an inkjet recording method. In the liquid-liquid reaction system using an organic acid, a liquid composition containing an organic acid is brought into contact with an ink containing a coloring material that can aggregate under acid conditions, on a recording medium for recording. When the ink comes into contact with the liquid composition, the pH of the ink is changed to acid, so that the coloring material aggregates. It has been known that if a liquid composition whose pH has been adjusted with a strong base, such as potassium hydroxide, is repeatedly ejected by the action of thermal energy in this system, ejection failure may occur. This is because the strong base dissolves a metal and/or metal oxide, such as tantalum and/or tantalum oxide, in the protecting layer of a heating resistor and thus erodes the protecting layer.

In order to prevent the erosion of the protecting layer caused by polyvalent metal ions in a liquid composition ejected by the action of thermal energy, Japanese Patent Laid-Open No. 2002-172847 proposes a method in which a sulfonic acid containing an amino group, such as taurine, is added to the liquid composition.

The present inventors however have found that if the method of the above-cited patent document is applied to a liquid-liquid reaction system using an organic acid, it is very difficult to prevent the erosion of the protecting layer of the heating resistor while satisfying the image quality required in recent years.

SUMMARY OF THE INVENTION

According to an aspect of the invention, there is provided a liquid composition used in combination with an ink containing a coloring material, ejected by the action of thermal energy from a recording head including a heating resistor having a protecting layer that contains at least one of a metal and a metal oxide and that is to come into contact with the liquid composition. The liquid composition contains an organic acid having a carboxy group, an alkali metal ion, an organic acid having a sulfonate group, a polyvalent metal ion, and water.

Further features of the present invention will become apparent from the following description of exemplary embodiments.

DESCRIPTION OF THE EMBODIMENTS

Aspects of the present invention will be further described using exemplary embodiments. In the following description, the liquid composition containing an organic acid and other substance may be expressed as that "containing ions" because the organic acid and other substances are dissociated in the liquid composition.

A mechanism of erosion of the protecting layer from the heating resistor will first be described in detail. When a liquid composition containing an organic acid having a carboxy group and a strong base, such as potassium hydroxide, is heated, the following phenomenon occurs in the liquid composition around the protecting layer. Specifically, part of the organic acid having a carboxy group in the liquid composition around the protecting layer may be decomposed by the heat of the heating resistor, or may be dehydrated within its molecule or among the molecules. For example, glutaric acid, which is an organic acid having carboxy groups, is condensed into glutaric acid anhydride by dehydration between the carboxy groups within the molecule at a temperature of about 150° C., lower than or equal to the maximum temperature of the heating resistor. Consequently, the acid to be neutralized by the strong base is lost. Accordingly, an excess of alkali metal ions derived from the strong base, such as potassium hydroxide, not used for neutralization is generated around the protecting layer of the heating resistor. It is supposed that the excess of alkali metal ions dissolves at least either metals or metal oxides contained in the protecting layer of the heating resistor, such as tantalum or tantalum oxide, and thus erodes the protecting layer.

When a liquid composition containing a sulfonic acid having an amino group, such as taurine, is used, the method disclosed in the above-cited patent document can prevent the erosion of the protecting layer, but cannot satisfy the image quality required in recent years, as mentioned above. The reason is as below: In order to suppress efficiently the dissolution of at least either the metal or the metal oxide in the protecting layer of the heating resistor, a considerably high amount of taurine must be added to the liquid composition. Unfortunately, sulfonic acids having an amino acid, such as taurine, generally have low solubilities in water while the solubility of the sulfonic acid having an amino group must be increased for suppressing the dissolution of the protecting layer of the heating resistor. For example, the organic acid content in the liquid composition may be reduced, or the solvent content in the composition may be reduced to increase the water content. If the organic acid content is reduced, however, high quality images (having a high optical density) cannot be sufficiently produced. If the solvent content is also reduced, sticking resistance cannot be satisfied. In the known method, it is thus very difficult to prevent the erosion of the protecting layer from the heating resistor while satisfying image quality required in recent years.

The present inventors found that the thermal decomposition and dehydration of the sulfonate group is more difficult to achieve than those of the carboxy group at a temperature lower than or equal to the maximum temperature of the heating resistor. Accordingly, the present inventors added a compound having a sulfonate group to a liquid composition containing an organic acid having a carboxy group and an alkali metal ion derived from a strong base, such as potassium hydroxide. As a result, the compound having a sulfonate group neutralized an excess of the alkali metal ions around the protecting layer of the heating resistor when the heating resistor generated heat. Thus, it has become possible to prevent the dissolution of the protecting layer by the strong base. In addition, it has been found that the addition of a polyvalent metal ion can prevent the erosion of the protecting layer of the heating resistor while satisfying the image quality. In other words, it has become possible that the erosion of the protecting layer is prevented with a high optical density ensured, which may be impossible in the method in which an organic acid and a sulfonic acid having an amino group, such as taurine, are used. A reason for this can be explained as below:

The description here will discuss liquid composition A containing only an organic acid having a carboxy group as a reaction agent, and liquid composition B containing a compound having a sulfonate group, and a polyvalent metal ion. Liquid composition A contains an organic acid having an acid buffer capacity. The acid buffer capacity controls the pH of the mixture of the liquid composition and an ink to a range in which the coloring material can aggregate, thus aggregating the coloring material. On the other hand, liquid composition B forms an aggregate with cation/anion electrostatic interaction between the cationic polyvalent metal ion and the coloring material. In the use of liquid composition A, the entire system containing the coloring material turns acid, so that aggregation occurs in the entire system of the mixture. On the other hand, in the use of liquid composition B, the polyvalent metal ion acts as the aggregation point. Hence, aggregation occurs more easily in liquid composition A than in liquid composition B. Accordingly, it may be that liquid composition A can aggregate the coloring material in the mixture faster than liquid composition B.

In liquid composition C containing two reaction agents that aggregate the coloring material at different speeds, the respective reaction agents and the coloring material interact with one another to form an aggregate of the coloring material. The present inventors hypothesize that at least one of the following phenomena (1) to (3) that can occur in the course of aggregation provides an optical density higher than the optical density resulting when either of the two reaction agents is singly used.

(1) When the liquid composition and an ink containing a coloring material are mixed on a recording medium, the organic acid having a carboxy group and the coloring material are associated by the acid buffer action of the organic acid, in the first reaction stage. Consequently, the coloring material in the ink is immediately associated to separate from the liquid phase. In the second reaction stage, the polyvalent metal ion forms a larger aggregate with the association of the coloring material formed by the acid buffer action in the first reaction stage. Since this aggregate is held on the recording medium rather than penetrating between the fibers of the recording medium, the optical density may increase.

(2) When the liquid composition and an ink containing a coloring material are mixed on a recording medium, the organic acid having a carboxy group, which is the reaction agent having a higher aggregation speed, is associated with the coloring material to form an aggregate by the acid buffer action. The aggregate fills spaces between the fibers of the recording medium, in the first reaction stage. Since an aggregate of the coloring material formed by an action with the polyvalent metal ion in the second reaction stage is deposited on the aggregate formed above, the aggregate formed in the second reaction stage is held on the recording medium rather than penetrating the spaces between the fibers of the recording medium. Thus, the optical density may increase.

(3) The coloring material having come into contact with the polyvalent ion in the second reaction stage of the above (1) or (2) forms an aggregate while spreading over the recording medium with a gently aggregated state maintained. Since the coloring material is aggregated over a wider region on the recording medium, non-uniformity of the coloring material can be prevented to increase the optical density over the entire image.

In the above aggregation phenomena of the coloring material, the mechanism of how the organic acid having a sulfonate group acts is not known. However, it is clear that the organic acid having a sulfonic acid exerts a favorable action because in the results of the Examples below, Comparative Examples using only an organic acid having a carboxy group, and Comparative Examples using only a polyvalent metal ion, the image densities of Examples remarkably increased.

The present inventors hypothesize that the organic acid having a sulfonate group contributes to stabilizing the polyvalent metal ion so that the second reaction stage occurs effectively.

The present inventors found that the above phenomena (1) to (3) can occur more efficiently when the carboxy group-containing organic acid content is 3.0% or more and 15.0% or less by mass relative to the total mass of the liquid composition. A reason for this can be explained as below:

A content of less than 3.0% by mass of carboxy group-containing organic acid does not have a sufficient acid buffer capacity because of a small amount of carboxy group, and consequently cannot sufficiently have the effect of increasing the optical density. In contrast, a content of more than 15.0% by mass of carboxy group-containing organic acid causes a large part of the coloring material to aggregate locally because of an excessive acid buffer capacity of the organic acid. Consequently, non-uniformity can occur, so that a sufficient optical density may not be obtained. Therefore, if the carboxy group-containing organic acid content is outside the above range, the polyvalent metal ion preferentially aggregates the coloring material even if the liquid composition contains the organic acid and the polyvalent metal ion together. Consequently, it becomes probably difficult that the two reaction agents interact efficiently with each other as described in the above (1) to (3).

In addition, the present inventors found that it may be the case that the pH of the liquid composition is controlled to 5.5 or less in view of the state of the coloring material in contact with the liquid composition. On the other hand, if the pH of the liquid composition is too low, a component of the inkjet recording apparatus may corrode. It may thus be the case that the liquid composition has a pH of 3.5 or more. The pH of the liquid composition mentioned herein is a value at 25° C., and can be measured with a normal pH meter. In the Examples described later, the pH was measured at 25° C. with a pH meter (model: F-21, manufactured by Horiba).

When the carboxy group-containing organic acid content is 3.0% or more and 15.0% or less by mass relative to the total mass of the liquid composition, and when the pH of the liquid composition is 3.5 or more and 5.5 or less, a much higher optical density than expected can be obtained.

Liquid Composition

Constituents of the liquid composition will now be described. The liquid composition may be colorless, milky-white or white so as not to affect images recorded with the ink. In particular, it may be the case that the liquid composition shows an absorption spectrum not having a peak in the range of 400 nm to 800 nm when it is diluted to 50 times (on a mass basis) with water. According to one aspect, such a liquid composition may not contain a coloring material.

Carboxy Group-containing Organic Acid

The organic acid mentioned herein refers to an organic compound with acidic properties. A carboxy group-containing organic acid used in the liquid composition of an embodiment of the invention can be a compound whose alkyl chain, not including the carbon of the carboxy group, has a carbon number of 3 or less. Such an organic acid is superior in solubility in water. Examples of the carboxy-group containing organic acid include monocarboxylic acids, such as formic acid, acetic acid, propionic acid, and butyric acid; dicarboxylic acids such as oxalic acid, malonic acid, succinic acid, and glutaric acid; and hydroxycarboxylic acids, such as malic acid and tartaric acid.

From the viewpoint of easy aggregation of the coloring material, dicarboxylic acids may be more suitable than monocarboxylic acids. The reason is not clear, but can be at least partially explained as below. Probably, the higher the ratio of the molar concentration of the carboxy group to the molar concentration of the coloring material at the time when the carboxy group-containing organic acid comes in contact with a coloring material, the higher the acid buffer capacity. Accordingly, as the molar concentration ratio of the carboxy group to the coloring material is increased, the aggregation of the coloring material by an acid is further promoted. It may therefore be the case that the reactivity can be enhanced by increasing the number of carboxy groups in a molecule. However, a trivalent or higher carboxylic acid, such as citric acid, may be less soluble in water, and, therefore, dicarboxylic acids can be advantageously used.

The carboxy group-containing organic acid used in the liquid composition is generally a weak acid, and the strength of the acid can be represented by an acid dissociation constant (pKa). The pKa value of the carboxy group-containing organic acid may be 2.5 or more and 6.5 or less in water at 25° C. from the viewpoint of aggregating the coloring material effectively. A carboxy group-containing organic acid with a pKa of less than 2.5 has a high acidity, and may corrode a component or member of the inkjet recording apparatus. In contrast, a carboxy group-containing organic acid with a pKa of more than 6.5 has a low acidity, and cannot aggregate the coloring material sufficiently to obtain a sufficient optical density. A divalent or higher carboxylic acid shows a plurality of stages of electrolytic dissociation according to the number of carboxy groups corresponding to the valence, and has a plurality of acid dissociation constants pKa. If the carboxy group-containing organic acid has a plurality of pKa values, it may be the case that all the pKa values are in the above range. The pKa mentioned herein is a value measured by potentiometric titration using 0.1 mol/L aqueous solution of sodium hydroxide.

Polyvalent Metal Ion

The polyvalent metal ion used in the liquid composition of an embodiment of the invention can be divalent or more metal ions. Examples of the divalent metal ion include ions of alkaline-earth metals, such as beryllium, magnesium, calcium, strontium, barium, and radium. Examples of the trivalent or more metal ion include ions of aluminum, yttrium, zirconium and iron, and other transition metal ions. The polyvalent metal ion can be added in a salt form, such as a hydroxide form or a chloride salt form, to the liquid composition, and may be produced by dissociation. It may be advantageous to add a polyvalent metal salt of the organic acid having a sulfonate group, more specifically an alkaline-earth metal salt, as the polyvalent metal ion. Such salts can easily form polyvalent metal ions in the liquid composition. For example, calcium methanesulfonate may be added.

The amount of polyvalent metal ion in the liquid composition of an embodiment of the invention may be $7.6\times10^{-4}$ mol or more and $2.3\times10^{-2}$ mol or less relative to 100 g of the liquid composition. That is, it may be $1.5\times10^{-3}$ mol or more and $1.1\times10^{-2}$ mol or less. It may also be the case that it is $3.1\times10^{-3}$ mol or more and $7.2\times10^{-3}$ mol or less. If the amount of polyvalent metal ion is less than $7.6\times10^{-4}$ mol relative to 100 g of the liquid composition, a sufficient optical density may not be obtained due to a small amount of polyvalent metal ion. In contrast, if it is more than $2.3\times10^{-2}$ mol relative to 100 g of the liquid composition, the liquid composition may have such a high viscosity that a sufficient ejection stability cannot be obtained.

Sulfonate Group-having Organic Acid

Water-soluble organic acids having a sulfonate group can be used advantageously in an embodiment of the invention. Although the sulfonate group-containing organic acid may have another anionic group as a polar functional group in addition to the sulfonate group, an organic acid having only a sulfonate group as the polar functional group may advantageously be used. Examples of the sulfonate group-containing organic acid include methanesulfonic acid, ethanesulfonic acid, and benzenesulfonic acid. Although an organic acid containing a polyvalent metal ion and an organic acid having a sulfonate group may be added separately to the liquid composition, it is advantageous to add a polyvalent salt of a sulfonate group-containing organic acid. In the liquid composition, at least part of the sulfonate group-containing organic acid is in the form of an ion. In embodiments of the present invention, the liquid composition containing an organic acid having a sulfonate group includes such a state. The sulfonate group-containing organic acid used in the liquid composition does not have an amino group.

According to one aspect, the sulfonate group-containing organic acid has a pKa of 6.5 or less. If the sulfonate group-containing organic acid has a plurality of polar functional groups, a plurality of pKa values is given. It may be the case that all the pKa values are 6.5 or less.

The amount of sulfonate group-containing organic acid in the liquid composition may be $3.6\times10^{-3}$ mol or more and $1.1\times10^{-1}$ mol or less relative to 100 g of the liquid composition. It may even be the case that it is $7.2\times10^{-3}$ mol or more and $5.4\times10^{-2}$ mol or less. If the amount of sulfonate group-containing organic acid is less than $3.6\times10^{-3}$ mol relative to 100 g of liquid composition, the alkali component may not be sufficiently neutralized because of a small amount of sulfonate group. In contrast, if it is more than $5.4\times10^{-2}$ mol relative to 100 g of the liquid composition, the liquid composition may have such a high viscosity that a sufficient ejection stability cannot be obtained.

Ratio of Carboxy Group-containing Organic Acid to Sulfonate Group-containing Organic Acid According to one aspect, the ratio of the carboxy group-containing organic acid content (% by mass) to the sulfonate group-containing organic acid content (% by mass) is 0.3 or more and 5.0 or less on a mass basis. If this ratio is less than 0.3, the liquid composition cannot sufficiently aggregate the ink containing a coloring material, and accordingly does not produce a sufficient effect of increasing the optical density because of a low content of carboxy group-containing organic acid. In contrast, if the content ratio is more than 5.0, the solubility of the sulfonate group-containing organic acid is reduced depending on its content, and may be precipitated to solidify in the head. Each organic acid content is a value relative to the total mass of the liquid composition, and is calculated as acid form.

Alkali Metal Ion

Examples of the alkali metal ions include lithium ion, potassium ion, and sodium ion. The alkali metal ion can be added in a salt form, such as a hydroxide form, to the liquid composition, and may be produced by dissociation. From the viewpoint of easy handing, for example, a hydroxide of the alkali metal ion can be added. For example, potassium hydroxide or sodium hydroxide may be added.

The alkali metal ion is added to adjust the pH of the liquid composition in a suitable range. According to one aspect, the content of the alkali metal ion in a salt form is 0.1% or more and 25.0% or less by mass relative to the total mass of the liquid composition. It may even be the case that it is 0.5% or more and 20.0% or less by mass.

Aqueous Medium

The liquid composition according to an embodiment of the present invention may contain water or an aqueous medium being a mixture of water and a water-soluble organic solvent. Deionized water (ion exchanged water) can be suitably used. The water content in the liquid composition can be 50.0% or more and 95.0% or less by mass relative to the total mass of the liquid composition.

The water-soluble organic solvent content in the liquid composition can be 3.0% or more and 50.0% or less by mass relative to the total mass of the liquid composition. Any water-soluble organic solvent generally used in liquids for the inkjet recording method can be used. Examples of the water-soluble organic solvent include alkyl alcohols having a carbon number in the range of 1 to 4, amide compounds, ketones and keto-alcohols, ethers, polyalkylene glycols, glycols, alkylene glycols containing an alkylene group having a carbon number of 2 to 6, alkyl ether acetates, alkyl ethers derived from polyhydric alcohols, and nitrogen-containing compounds. These water-soluble organic solvent may be used singly or in combination.

Other Constituents

The liquid composition may further contain a water-soluble organic compound that is solid at room temperature, such as urea, urea derivatives, trimethylolpropane, or trimethylolethane. In addition, other additives, such as surfactant, pH adjuster, rust preventive, preservative, fungicide, antioxidant, and antireductant, may optionally be added so that the liquid composition has suitable properties.

Ink

Ink Coloring Material

The coloring material in an ink used in combination with the liquid composition will now be described. The coloring material can be at least either a dye or a pigment. In an embodiment of the invention, a pigment may be advantageously used because of its fastness or other properties. Both a pigment and a dye may be used in combination. The coloring material content is suitably 0.1% or more and 15.0% or less by mass, and may even be 1.0% or more and 10.0% or less by mass, relative to the total mass of the ink.

Dye

The dye may be selected from the known dyes without particular limitation. Examples of the dye include direct dyes, acid dyes, basic dyes, disperse dyes, and food dyes. A dye that aggregates when the liquid composition and the ink are mixed may be selected.

Pigment

The pigment may be selected from the known inorganic pigments and organic pigments without particular limitation. The pigment may be of polymer-dispersion type that is dispersed using a polymer as a dispersant (polymer-dispersion pigment using a polymeric dispersant, microencapsulated pigment composed of particles whose surfaces are coated with a polymer, or polymer-bonded self-dispersing pigment composed of pigment particles having an organic group, including a polymer, chemically bonded to the surfaces) or of self-dispersing type whose particles have hydrophilic groups at the surfaces (self-dispersing pigment). Two or more pigments different in dispersion method may be used in combination.

Dispersant

If a pigment is used as the coloring material of the ink, a polymer-dispersion pigment can be advantageously used. In this instance, the dispersant can be a substance whose anionic group acts to disperse the pigment stably in an aqueous medium. Any polymer used in the known inks can be used as the dispersant. The polystyrene-equivalent weight average molecular weight of the dispersant may be 1,000 or more and 30,000 or less, such as 3,000 or more and 15,000 or less, wherein the polystyrene-equivalent weight average molecular weight is measured by gel permeation chromatography (GPC). The acid value of the polymer used as the dispersant may be 50.0 mg KOH/g or more and 300.0 mg KOH/g or less. According to one aspect, the acid value may be 100.0 mg KOH/g or more and 150.0 mg KOH/g or less.

Aqueous Medium and Other Constituents

The ink may contain water or an aqueous medium being a mixture of water and a water-soluble organic solvent. The water-soluble organic solvent content in the ink can be 3.0% or more and 50.0% or less by mass relative to the total mass of the ink. The water-soluble organic solvents cited above as those used in the liquid composition can be used in the ink. Deionized water (ion exchanged water) can be suitably used. The water content in the ink may be 50.0% or more and 95.0% or less by mass relative to the total mass of the ink. The ink may contain some of the other constituents cited as additives used in the liquid composition.

Set of Liquid Composition and Ink

The liquid composition according to an embodiment of the invention can be used as a set in combination with the ink containing a coloring material. The set is in a state where the liquid composition of an embodiment of the invention and color inks, such as cyan, magenta, yellow, red, green, blue, and black, are used together. The ink to be combined into the set is not particularly limited, as long as the set includes at least one ink that can aggregate when it is mixed with the liquid composition. The set according to an embodiment of the invention may be one body into which a plurality of liquid cartridges are integrated, a group including a plurality of separate liquid cartridges, or a unit including liquid cartridges and a recording head.

Inkjet Recording Method

The inkjet recording method according to an embodiment of the invention includes the step of ejecting a liquid composition by the action of thermal energy. More specifically, the inkjet recording method can include two steps: step A of ejecting a liquid composition from a recording head onto a recording medium by the action of thermal energy; and step B of applying an ink onto the recording medium. Step A may be performed before step B, or step B may precede.

Liquid Cartridge

The liquid cartridge according to an embodiment of the present invention includes a storage portion in which the liquid composition of an embodiment of the invention is accommodated.

Recording Unit

A recording unit suitably used for recording with the liquid composition of embodiments of the invention includes a thermal inkjet recording head having a heating resistor generating a thermal energy for ejecting the liquid composition from an ejection orifice, and a storage portion in which the liquid composition is accommodated. The heating resistor has a protecting layer containing at least one of a metal and a metal oxide on its surface coming into contact with the liquid composition. Examples of the metal or metal oxide include metals, such as Ta, Zr, Ti, Ni, Al, and W, and their metal oxides. The recording unit of an embodiment of the invention can be a unit into which the liquid cartridge and the recording head are integrated.

Inkjet Recording Apparatus

The inkjet recording apparatus according to an embodiment of the invention includes a thermal inkjet recording head having a heating resistor generating a thermal energy for ejecting a liquid composition, and a storage portion in which the liquid composition is accommodated. The recording head may include a recording element having a line of liquid composition ejection orifices and a line of ink ejection orifices, or may include recording elements, each having either a line of liquid composition ejection orifices or a line of ink ejection orifices. From the viewpoint of the reliability of the ink and liquid composition, for example, from the viewpoint of preventing sticking, the latter structure may be advantageous, because the recording elements of a general inkjet recording apparatus are each provided with a cap for capping. If the liquid cartridge has a structure applying a negative pressure to the recording head, the liquid cartridge may have the following structure. An absorber may be provided in the storage portion of the liquid cartridge, or the cartridge may include a flexible storage bag and a spring portion applying a pressing force to the storage bag in a direction in which the inner volume of the storage bag can be expanded.

EXAMPLES

Aspects of the invention will further be described in detail with reference to the following Examples and Comparative Examples. However, the invention is not limited to the Examples unless departing from the scope and spirit of the invention. In the following description, "%" and "part(s)" used in the description of preparation of pigment-dispersed liquids, inks, and liquid compositions are on a mass basis unless otherwise specified.

Preparation of Pigment-dispersed Liquid

A pigment (carbon black)-dispersed liquid was prepared according to the following procedure: A carbon black pigment-dispersed liquid (pigment content: 15.0%; polymer content: 7.5%; volume average particle size: 105 nm) was prepared by mixing 37.5 parts of polymer aqueous solution containing 20.0% of styrene-(n-butyl acrylate)-acrylic acid polymer (compositional molar ratio: 33:44:23; weight average molecular weight: 5,000; acid value: 120.2 mg KOH/g) neutralized with 1 equivalent of potassium hydroxide (KOH), 15.0 parts of carbon black, and 47.5 parts of water in a ball mill with zirconia beads.

Preparation of ink

The resulting carbon black pigment-dispersed liquid and other constituents shown below were mixed and stirred sufficiently. The mixture was subjected to pressure filtration through a cellulose acetate filter having a pore size of 1.2 μm (manufactured by Advantec) to yield an ink. The ink was combined into a set with a liquid composition prepared as below.

Pigment-dispersed liquid: 20.0%
Polyethylene glycol 600: 9.0%
Glycerol: 6.0%
Acetylenol E 100 (produced by Kawaken Fine Chemical): 1.0%
Water: 64.0%

Preparation of Liquid Compositions

Compositions of Examples and Comparative Examples were prepared by sufficiently mixing and stirring the constituents according to Tables 1 to 3. Each mixture was subjected to pressure filtration through a cellulose acetate filter having a pore size of 0.45 μm (manufactured by Advantec) to yield a liquid composition. The pH was adjusted to the value shown in Tables 1 to 3 with 8 mol/L aqueous solution of potassium hydroxide (KOH) or sodium hydroxide (NaOH). The pH of the resulting liquid composition was measured at 25° C. with a pH meter F-21 manufactured by Horiba. Acetylenol E 100 shown in the Tables is a surfactant produced by Kawaken Fine Chemical. In measurement of absorbance of 50-time diluted liquid compositions (on a mass basis), each liquid composition of the Examples did not exhibit a peak in the range of 400 nm to 800 nm.

Evaluation

Erosion of Protecting Layer

The resulting liquid composition was loaded in an inkjet recording apparatus (product name: PIXUS iP3300, manufactured by Canon) including a recording head ejecting an ink and a liquid composition by the action of thermal energy. Continuous ejection tests were performed under the recording conditions: ejection amount per droplet of 5 pL; ejection frequency of 15,000 Hz; number of ejections of $3.0 \times 10^8$. In the recording head of the inkjet recording apparatus, the protecting layer of the heating resistor is made of tantalum and tantalum oxide. After the continuous test, the section of the protecting layer was observed through a focused ion beam scanning electron microscope (FIB-SEM, model DB235, manufactured by FEI). The remaining thickness of the protecting layer of the heating resistor was calculated from the following equation:

Remaining thickness (%) of protecting layer ={(thickness of protecting layer after continuous ejection test)/(thickness of protecting layer before continuous ejection test)}×100

The evaluation criteria were as follows, and the results are shown in Tables 1 to 3. In the evaluation of the Examples, A represents that the results were in a favorable level, and B represents that the results were in an unacceptable level.

A: The remaining thickness of the protecting layer was 50% or more.
B: The remaining thickness of the protecting layer was less than 50%.

Optical Density

The resulting ink and liquid composition were loaded in an inkjet recording apparatus (product name: PIXUS Pro9500, manufactured by Canon) including a recording head ejecting a liquid by the action of thermal energy. In the recording head of the inkjet recording apparatus, the protecting layer of the heating resistor is made of tantalum and tantalum oxide. The recording head had two recording elements so that the liquid composition and the ink could be ejected from respective ejection orifice lines provided to different recording elements. The recording was performed under the following conditions: temperature of 23° C., relative humidity of 55%, recording density of 4,800 dpi×2,400 dpi, and ejection amount of 3.0 pL. An image was formed on a recording medium at an ink recording duty of 150% and a liquid composition recording duty of 50%. In the evaluation, the recording duty of 100% was the condition where four droplets of ink were applied in a unit region of 1/600 dpi×1/600 dpi at a resolution of 600 dpi×600 dpi using an inkjet recording apparatus, wherein the volume per droplet was 3.5 pL. The liquid composition was applied onto a recording medium, and subsequently the ink was applied onto the liquid composition on the recording medium. The resulting recorded matter was dried for 24 hours under conditions of 23° C. in temperature and 55% in relative humidity. The resulting image was used for evaluation.

The optical density of the image formed above was measured. The optical density was measured with a spectrophotometer (product name: Spectrolino, produced by Gretag Macbeth) with a light source of D50, and a viewing angle of 2°. The optical density was evaluated according to the following criteria. The results are shown in Tables 1 to 3. In the evaluation criteria of optical density, AA to B represent that the results were at favorable levels as the optical density of recorded matter, and C and D represent that the results were at unacceptable levels as the optical density of recorded matter.

AA: 1.50≦optical density
A: 1.45≦optical density<1.50
B: 1.40≦optical density<1.45
C: 1.30≦optical density<1.40
D: optical density<1.30

TABLE 1

COMPOSITIONS AND EVALUATION RESULTS OF LIQUID COMPOSITIONS (Unit: %)

| Example | Example 1 | Example 2 | Example 3 | Example 4 | Example 5 | Example 6 | Example 7 | Example 8 | Example 9 |
|---|---|---|---|---|---|---|---|---|---|
| Acetic acid | 6.0 | — | — | — | — | — | — | — | — |
| Glutaric acid | — | 9.4 | 9.4 | 9.4 | 9.4 | 9.4 | 9.4 | 4.1 | 13.5 |
| Calcium methanesulfonate | 4.1 | 4.1 | 4.1 | 4.1 | 4.1 | 4.1 | 4.1 | 9.4 | 4.1 |
| Trimethylolpropane | 20.0 | 20.0 | 20.0 | 20.0 | 20.0 | 20.0 | 20.0 | 20.0 | 20.0 |
| Acetylenol E 100 | 0.1 | 0.1 | 0.1 | 0.1 | 0.1 | 0.1 | 0.1 | 0.1 | 0.1 |
| Water + pH adjuster | 69.8 | 66.4 | 66.4 | 66.4 | 66.4 | 66.4 | 66.4 | 66.4 | 62.3 |
| pH adjuster (*1) | KOH | KOH | KOH | KOH | KOH | KOH | NaOH | KOH | KOH |
| pH (*2) | 3.5 | 6.0 | 5.5 | 4.5 | 3.0 | 3.5 | 3.5 | 3.5 | 3.5 |
| Carboxy group-containing organic acid content | 6.0 | 9.4 | 9.4 | 9.4 | 9.4 | 9.4 | 9.4 | 4.1 | 13.5 |
| Carboxy group-containing organic acid content/sulfonate group-containing organic acid content | 1.46 | 2.29 | 2.29 | 2.29 | 2.29 | 2.29 | 2.29 | 0.44 | 3.29 |
| Protecting layer erosion | A | A | A | A | A | A | A | A | A |
| Optical density | A | A | AA | AA | A | AA | AA | AA | AA |

(*1) KOH: potassium hydroxide, NaOH: Sodium hydroxide
(*2) pH of liquid composition at 25° C.

TABLE 2

COMPOSITIONS AND EVALUATION RESULTS OF LIQUID COMPOSITIONS (Unit: %)

| Example | Example 10 | Example 11 | Example 12 | Example 13 | Example 14 | Example 15 | Example 16 | Example 17 | Example 18 |
|---|---|---|---|---|---|---|---|---|---|
| Glutaric acid | 2.5 | 3.0 | 15.0 | 15.5 | 9.4 | 3.0 | 10.5 | 3.0 | 9.4 |
| Calcium methanesulfonate | 4.1 | 4.1 | 4.1 | 4.1 | 1.9 | 9.6 | 1.9 | 12.0 | — |
| Methanesulfonic acid | — | — | — | — | — | — | — | — | 4.1 |
| Yttrium nitrate | — | — | — | — | — | — | — | — | 5.0 |
| Trimethylolpropane | 20.0 | 20.0 | 20.0 | 20.0 | 20.0 | 20.0 | 20.0 | 20.0 | 20.0 |
| Acetylenol E 100 | 0.1 | 0.1 | 0.1 | 0.1 | 0.1 | 0.1 | 0.1 | 0.1 | 0.1 |
| Water + pH adjuster | 73.3 | 72.8 | 60.8 | 60.3 | 68.6 | 67.3 | 67.5 | 64.9 | 61.4 |
| pH adjuster (*1) | KOH | KOH | KOH | KOH | KOH | KOH | KOH | KOH | KOH |
| pH (*2) | 3.5 | 3.5 | 3.5 | 3.5 | 3.5 | 3.5 | 3.5 | 3.5 | 3.5 |
| Carboxy group-containing organic acid content | 2.5 | 3.0 | 15.0 | 15.5 | 9.4 | 3.0 | 10.5 | 3.0 | 6.5 |
| Carboxy group-containing organic acid content/sulfonate group-containing organic acid content | 0.61 | 0.73 | 3.66 | 3.78 | 4.95 | 0.31 | 5.53 | 0.25 | 0.59 |
| Protecting layer erosion | A | A | A | A | A | A | A | A | A |
| Optical density | A | AA | AA | A | AA | AA | A | A | AA |

(*1) KOH: potassium hydroxide, NaOH: Sodium hydroxide
(*2) pH of liquid composition at 25° C.

TABLE 3

COMPOSITIONS AND EVALUATION RESULTS OF LIQUID COMPOSITIONS (Unit: %)

| Example | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Acetic acid | 6.0 | — | — | 6.0 | — | — | — | — | — |
| Glutaric acid | — | 9.4 | 2.5 | — | — | — | 3.0 | — | 9.4 |
| Calcium methanesulfonate | — | — | — | — | 13.5 | — | — | 2.0 | 4.1 |
| Methanesulfonic acid | — | — | — | 1.8 | — | — | — | — | — |
| Calcium nitrate | — | — | 1.8 | — | — | 13.5 | — | — | — |
| Taurine | — | — | — | — | — | — | 5.6 | 2.0 | — |
| Trimethylolpropane | 20.0 | 20.0 | 20.0 | 20.0 | 20.0 | 20.0 | 20.0 | 20.0 | 20.0 |
| Acetylenol E 100 | 0.1 | 0.1 | 0.1 | 0.1 | 0.1 | 0.1 | 0.1 | 0.1 | 0.1 |
| Water + pH adjuster | 73.9 | 70.5 | 75.6 | 72.1 | 66.4 | 66.4 | 71.3 | 75.9 | 66.4 |
| pH adjuster (*1) | KOH | KOH | KOH | KOH | KOH | KOH | KOH | KOH | — |
| pH (*2) | 3.5 | 3.5 | 3.5 | 3.5 | 3.5 | 3.5 | 3.5 | 3.5 | 2.0 |
| Carboxy group-containing organic acid content | 6.0 | 9.4 | 2.5 | 7.9 | 0 | 0 | 3.0 | 0 | 9.4 |
| Carboxy group-containing organic acid content/sulfonate group-containing organic acid content | — | — | — | 3.33 | — | — | 1.07 | — | 2.29 |
| Protecting layer erosion | B | B | B | A | B | B | A | A | — |
| Optical density | D | C | D | D | B | B | D | D | — |

(*1) KOH: potassium hydroxide, NaOH: Sodium hydroxide
(*2) pH of liquid composition at 25° C.

The optical density of Example 1 was at A level, but was slightly lower than the optical density of A-level images of the other Examples. If the pH of the liquid composition was less than 3.5, as in Example 5, the acid resistance of the liquid composition to the member coming into contact with the liquid composition was inferior to that of liquid composition having a pH of 3.5 or more, as in Example 6. The pH of Comparative Example 9 was so low that the member of the inkjet recording apparatus coming into contact with the liquid composition was partially corroded, and could not be evaluated. In Comparative Examples 7 and 9, the erosion of the protecting layer was evaluated as A level, but the remaining thickness was slightly smaller than that of the other A-level Examples. A liquid composition using sulfuric acid, which is an inorganic acid, instead of the sulfonate group-containing organic acid was examined. However, the evaluation was impossible because the liquid composition could not be ejected.

Thus, aspects of the present invention may provide a liquid composition that can prevent the protecting layer of a heating resistor from being eroded during continuous ejection, and that can provide high-density images when it is used in combination with an ink containing a coloring material. Furthermore, aspects of the invention may provide a set and a liquid cartridge including the liquid composition, and an inkjet recording method and an inkjet recording apparatus using the liquid composition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-209538 filed Sep. 10, 2009, which is hereby incorporated by reference herein in its entirety.

What is claimed is:

1. A liquid composition used in combination with an ink containing a coloring material, ejected by the action of thermal energy from a recording head including a heating resistor having a protecting layer that contains at least one of a metal and a metal oxide and that is to come into contact with the liquid composition, the liquid composition comprising:

an organic acid having a carboxy group;

an alkali metal ion;

an organic acid having a sulfonate group;

a polyvalent metal ion; and water.

2. The liquid composition according to claim 1, wherein the organic acid having the carboxy group comprises a dicarboxylic acid.

3. The liquid composition according to claim 1, wherein the pH of the liquid composition is 3.5 or more and 5.5 or less.

4. The liquid composition according to claim 1, wherein the content of the organic acid having the carboxy group is 3.0% or more and 15.0% or less by mass relative to the total mass of the liquid composition.

5. The liquid composition according to claim 1, wherein the ratio of the content of the organic acid having the carboxy group to the content of the organic acid having the sulfonate group is 0.3 or more and 5.0 or less on a mass basis.

6. A set comprising: an ink containing a coloring material; and the liquid composition as set forth in claim 1.

7. A liquid cartridge comprising a storage portion in which the liquid composition as set forth in claim 1 is accommodated.

8. An inkjet recording method comprising the step of ejecting the liquid composition as set forth in claim 1 by the action of thermal energy.

9. An inkjet recording apparatus comprising:

a storage portion in which the liquid composition as set forth in claim 1 is accommodated; and the recording head from which the liquid composition is ejected, the recording head including the heating resistor having the protecting layer that is to come into contact with the liquid composition and that contains at least one of the metal and the metal oxide.

10. The inkjet recording apparatus according to claim 9, wherein the metal comprises tantalum, and the metal oxide comprises tantalum oxide.

* * * * *